United States Patent
Presentey

[11] 3,851,535
[45] Dec. 3, 1974

[54] SPECIAL BELT AND PULLEY RIM TRANSMISSION DEVICE

[76] Inventor: Shelley M. Presentey, 1268 Henry Farm Dr., Ottawa, K2C2E2, Canada

[22] Filed: Apr. 6, 1973

[21] Appl. No.: 348,740

[52] U.S. Cl. .................. 74/229, 74/231 R
[51] Int. Cl. .............................. F16h 7/00
[58] Field of Search............ 74/216.5, 231 R, 230.5, 74/229, 216, 221, 230.01, 230.05

[56] References Cited
UNITED STATES PATENTS

| | | | |
|---|---|---|---|
| 489,323 | 1/1893 | Noble et al. | 74/221 |
| 1,592,416 | 7/1926 | Brownell | 74/231 R |
| 1,969,792 | 8/1934 | Gates | 74/229 |
| 2,183,253 | 12/1939 | Harman | 74/229 |
| 2,391,642 | 12/1945 | Reed | 74/230.5 |
| 2,466,495 | 4/1949 | Slemmons | 74/229 |

FOREIGN PATENTS OR APPLICATIONS

| | | | |
|---|---|---|---|
| 1,126,202 | 6/1959 | Germany | 74/216.5 |
| 727,382 | 2/1966 | Canada | 74/230.5 |
| 782,790 | 6/1935 | France | 74/231 |

Primary Examiner—Benjamin W. Wyche
Assistant Examiner—Allan R. Burke
Attorney, Agent, or Firm—Michael S. Striker

[57] ABSTRACT

A belt transmission which uses a crowned pulley with a rim whose peripheral surface has sections with different radii of curvature. The belt fully engages the central section of the peripheral surface but is in less pronounced frictional engagement or totally out of engagement with the outer sections. This reduces the likelihood that the belt would slip off the rim in response to stalling or sudden braking of the pulley or belt. The thickness of the central belt portion exceeds the thickness of the marginal portions to further increase the belt-pulley friction contrast between the central section and the outer sections.

11 Claims, 4 Drawing Figures

PATENTED DEC 3 1974

3,851,535

SPECIAL BELT AND PULLEY RIM TRANSMISSION DEVICE

BACKGROUND OF THE INVENTION

The present invention relates to belt transmissions in general, and more particularly to improvements in belt transmissions which employ crowned pulleys and to improvements in belts for use with crowned pulleys.

It is well known that a belt which drives, or is driven by, a crowned pulley will tend to climb to the largest diameter and will normally remain in a central position to thus eliminate the need for flanges. The convexity of presently known crowned pulleys is constant from one to the other axial end of the rim and is invariably selected in such a way that the entire internal surface of the belt comes to contact with the peripheral surface of the rim. Such pulleys are satisfactory when the transmission load is reasonably constant, the elasticity of the belt is low, and no significant torque jolts or stall efforts are expected when the belt transmission is in use. However, the belt exhibits a marked tendency to slip off a crowned pulley if the transmission is subjected to a sudden or substantial torque load or stall load, and especially if the transmission uses a belt having a pronounced elasticity. This eliminates such belt transmissions from finding use in hard-to-reach areas, e.g., in an encapsulated housing, and in all such instances where an elastic belt is desirable for other reasons, for example, to compensate for variations in temperature.

SUMMARY OF THE INVENTION

An object of the invention is to provide a belt transmission with one or more novel and improved driving or driven crowned pulleys which prevent lateral shifting of the belt during stall or in response to abrupt braking.

Another object of the invention is to provide a crowned pulley which can prevent lateral shifting of elastic belts.

A further object of the invention is to provide a crowned pulley which contributes to reliability of the belt transmission and can be used as a superior substitute for crowned or uncrowned pulleys in existing belt transmissions.

An additional object of the invention is to provide a novel belt for use in transmissions which employ the improved crowned pulley or pulleys and/or standard crowned pulleys.

Still another object of the invention is to provide a self-centering belt transmission which is sufficiently reliable to permit encapsulation so that it components cannot be reached for inspection and/or lateral shifting of a displaced belt back to a central position.

The improved transmission comprises at least one rotary crowned pulley which may be a driving pulley or a driven pulley, and a belt which is trained over the pulley with at least some tension. The rim of the pulley has a multiconvex peripheral surface including a central section and two additional sections which flank the central section. The belt overlies the central section and at least a portion of each additional section, and has an internal surface which is in more pronounced frictional engagement with the central section and in less pronounced frictional engagement with the additional sections. The frictional engagement between the internal surface and the additional sections of the peripheral surface may be zero or decreases gradually or stepwise in directions toward both axial ends of the rim.

The radii and centers of curvature of the central section and additional sections may be different, and the radius of curvature of each section may vary in a direction from the one toward the other axial end of the rim.

The thickness of the central portion of the belt may exceed the thickness of the marginal portions.

The novel features which are considered as characteristic of the invention are set forth in particular in the appended claims. The improved belt transmission itself, however, both as to its construction and its mode of operation, together with additional features and advantages thereof will be best understood upon perusal of the following detailed description of certain specific embodiments with reference to the accompanying drawing.

DESCRIPTION OF THE PREFERRED EMBODIMENTS

Figure 1:
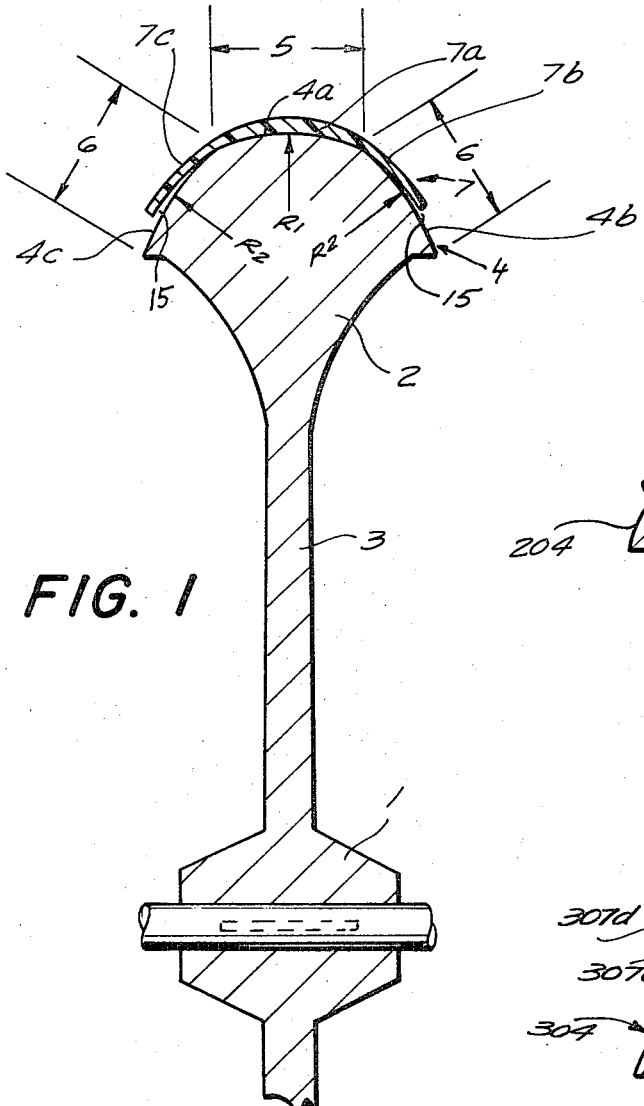
FIG. 1 is a fragmentary axial sectional view of a crowned pulley which embodies one form of the invention and a transverse sectional view of a novel belt.

The crowned pulley shown in FIG. 1 has a hub 1, a rim 2, and a connecting portion 3 which extends between the hub 1 and rim 2 and may constitute a circumferentially complete disk or it may consist of discrete spokes.

In accordance with a feature of the invention, the peripheral surface 4 of the rim 2 is a multiconvex surface having at least two different radii of curvature, namely a radius $R_1$ and a radius $R_2$. The radius $R_1$ is selected for the annular central section 4a of the surface 4, and the radius $R_2$ is selected for each of the two additional or outer annular sections 4b, 4c which flank the central section 4a. The transition between the section 4a and sections 4b, 4c is preferably gradual (i.e., without a pronounced edge), and the width 5 of the section 4a (as considered in the axial direction of the pulley) may but need not exceed the width 6 of the section 4b or 4c.

The belt (which may drive or be driven by the pulley) is shown at 7. This belt has an internal surface including a central portion which engages the section 4a and marginal portions which overlie the respective outer sections 4b, 4c with a clearance or gap 15 whose width increases in a direction away from the section 4a, i.e. toward the respective axial ends of the rim 2. The thickness of the median portion or zone 7a of the belt preferably (but not necessarily) exceeds the thickness of the adjacent marginal portions 7b, 7c.

It will be noted that the effective width of the belt 7 corresponds to the width 5 of the central surface section 4a on the rim 2. The marginal portions 7b, 7c may but need not contact the respective surface sections 4b, 4c; at any rate, the frictional engagement along the sections 4b, 4c is less pronounced along the central section 4a.

It is assumed that the pulley is driven by the belt 7 and that it is stalled or abruptly braked. Due to less pronounced (or non-existent) friction along the sections 4b and 4c, the friction between the internal surface of the central portion 7a of the belt 7 and the surface section 4a effectively opposes the tendency of the belt to slip off the pulley. The belt remains in the illustrated centered position.

In a conventional belt transmission wherein the friction between the belt and the crown of a pulley having a rim with a convex peripheral surface of constant radius of curvature is pronounced all the way between the edge faces of the belt, the belt will invariably slip laterally in response to stalling or sudden braking of the pulley. This is attributed to unequal binding action between the rim and the marginal portions of the belt, especially if the material of the belt is highly elastic.

Another feature of the invention resides in the specific profile of the belt 7. This belt bulges at least slightly at the center, i.e., the thickness of the median portion 7a exceeds the thickness of the marginal portion 7b or 7c. The transition between the portion 7a on the one hand and the portions 7b, 7c on the other hand is preferably gradual. Such profiling of the belt contributes to friction between the internal surface of the portion 7a and surface section 4a to thus further reduce the likelihood of lateral slippage in response to stall or in response to abrupt braking of the pulley or belt. In other words, the just discussed profiling of the belt enhances the belt-pulley friction contrast between 4a, 7a on the one hand and 4b, 7b and 4c, 7c on the other hand.

Figure 3:
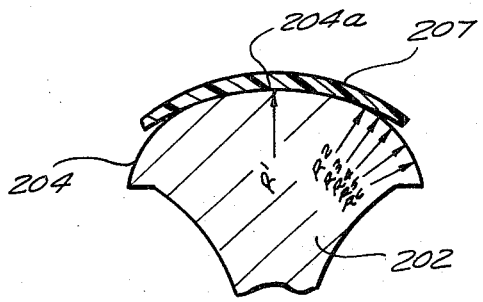
FIG. 3 is a fragmentary axial sectional view of a third pulley.
Figure 2:
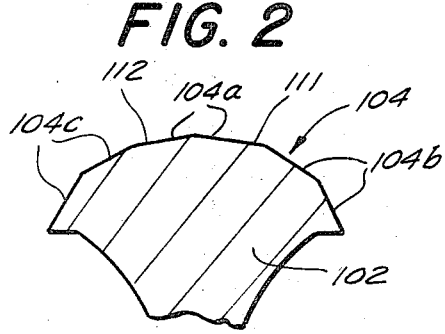
FIG. 2 is a fragmentary axial sectional view of a second pulley.

The peripheral surface of the rim may but need not be a truly arcuate surface. Thus, at least one of the surface sections may consist of two or more circumferentially complete facets as shown in FIG. 2. The rim 102 has a peripheral surface 104 with sections 104a, 104b, 104c. Each of these sections exhibits two mutually inclined facets, such as the facets 111 and 112 of the section 104a. The facets may be conical or convex surface portions. It can be said that the peripheral surface 104 of the rim 102 has three different radii of curvature. Good results were achieved with a peripheral surface having six different radii of curvature as shown in FIG. 3 (see the radii $R^1$, $R^2$, $R^3$, $R^4$, $R^5$ and $R^6$). The belt 207 overlies the central section 204a of the surface 204 and the frictional engagement between the belt 207 and the rim 202 decreases toward the edges of the belt. Such frictional engagement can terminate at the radii $R^2$, $R^3$, $R^4$, $R^5$ or $R^6$. The clearance between the marginal zones of the belt 207 and the adjacent portions of the rim 202 is highly desirable but not essential, as long as the friction along the marginal portions is less than between the central belt portion and the central section of the peripheral surface.

Figure 4:
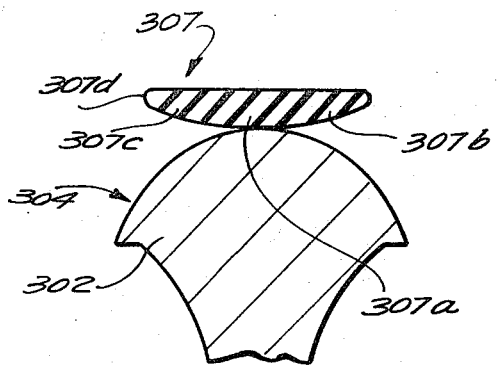
FIG. 4 is an axial sectional view of a presently preferred belt which is trained over a pulley similar to that shown in FIG. 1.

FIG. 4 shows a presently preferred embodiment of the improved belt. The belt 307 has a convex internal surface and two rounded or flat edge faces 307d. When the belt 307 is trained over the rim 302, only its relatively thick median portion 307a engages the central section of the peripheral surface 304 of the pulley whereas the marginal portions 307b, 307c remain spaced apart from the adjoining outer sections of the peripheral surface. Regardless of the number of radii of curvature of the sections of the peripheral surface 304, the overall curvature of the peripheral surface 304 is preferably a "high" curve at the center and a "flatter" curve at the ends. This is achieved by varying the loci of the centers of curvature of sections of the peripheral surface 304.

The belt 307 consists of rubber or a similar elastomeric material.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. In a belt transmission, a combination comprising a rotary crowned pulley having a rim provided with a multiconvex peripheral surface including a central section and additional sections flanking said central section; and an endless belt trained over said peripheral surface so as to overlie said central section and at least a portion of each of said additional sections, said belt having an internal surface having said pulley rim which is convex when said belt is unstressed and which is in more pronounced frictional engagement with said central section and in less pronounced frictional engagement with said additional sections when said belt is trained over said peripheral surface, as a result of the original convexity of said internal surface of said belt and the multiconvexity of said peripheral surface.

2. A combination as defined in claim 1, wherein the frictional engagement between said internal surface and said additional sections is zero.

3. A combination as defined in claim 1, wherein the friction between said internal surface and said additional sections decreases in directions toward the edges of said belt.

4. A combination as defined in claim 1, wherein at least one of said sections is facetted.

5. A combination as defined in claim 1, wherein said sections have different radii of curvature and different centers of curvature.

6. A combination as defined in claim 1, wherein said internal surface is convex.

7. A combination as defined in claim 1, wherein the thickness of that portion of said belt which engages said central section exceeds the thickness of those portions of said belt which are adjacent to said additional sections.

8. A combination as defined in claim 1, wherein said peripheral surface has at least three different radii of curvature.

9. A combination as defined in claim 1, wherein the width of said peripheral surface exceeds the width of said belt.

10. A combination as defined in claim 1, wherein said internal surface defines with said additional sections a pair of gaps whose width increases toward the respective axial ends of said rim.

11. A combination as defined in claim 1, wherein said belt consists of elastomeric material.

* * * * *

UNITED STATES PATENT AND TRADEMARK OFFICE
CERTIFICATE OF CORRECTION

PATENT NO. : 3,851,535
DATED : December 3, 1974
INVENTOR(S) : Shelley M. Presentey It is certified that error appears in the above—identified patent and that said Letters Patent are hereby corrected as shown below:

Column 4, line 27, "having said pulley rim"

should read --facing said pulley rim--.

Signed and Sealed this eighth Day of June 1976

[SEAL]

Attest:

RUTH C. MASON
Attesting Officer

C. MARSHALL DANN
Commissioner of Patents and Trademarks